US008640005B2

(12) United States Patent
Wilkerson et al.

(10) Patent No.: US 8,640,005 B2
(45) Date of Patent: Jan. 28, 2014

(54) METHOD AND APPARATUS FOR USING CACHE MEMORY IN A SYSTEM THAT SUPPORTS A LOW POWER STATE

(75) Inventors: Christopher B. Wilkerson, Portland, OR (US); Alaa R. Alameldeen, Hillsboro, OR (US); Zeshan A. Chishti, Hillsboro, OR (US); Dinesh Somasekhar, Portland, OR (US); Wei Wu, Portland, OR (US); Shih-Lien Lu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 523 days.

(21) Appl. No.: 12/785,182

(22) Filed: May 21, 2010

(65) Prior Publication Data

US 2011/0289380 A1 Nov. 24, 2011

(51) Int. Cl.
*G11C 29/00* (2006.01)
(52) U.S. Cl.
USPC ........................................................ 714/763
(58) Field of Classification Search
USPC ......... 714/763, 785, 777, 784, 746, 781, 718, 714/799, 769, 764, 754; 711/144
See application file for complete search history.

(56) References Cited

U.S. PATENT DOCUMENTS

| 4,139,148 | A | * | 2/1979 | Scheuneman et al. | 714/753 |
| 4,236,247 | A | * | 11/1980 | Sundberg | 714/765 |
| 5,604,213 | A | * | 2/1997 | Barrie et al. | 514/176 |
| 5,802,582 | A | * | 9/1998 | Ekanadham et al. | 711/152 |
| 6,044,479 | A | * | 3/2000 | Dell | 714/48 |
| 6,480,975 | B1 | * | 11/2002 | Arimilli et al. | 714/52 |
| 6,631,489 | B2 | * | 10/2003 | Quach et al. | 714/746 |
| 6,772,383 | B1 | * | 8/2004 | Quach et al. | 714/746 |
| 7,296,213 | B2 | * | 11/2007 | Vainsencher et al. | 714/784 |
| 7,376,877 | B2 | * | 5/2008 | Quach et al. | 714/746 |
| 7,389,465 | B2 | * | 6/2008 | Radke et al. | 714/755 |

(Continued)

FOREIGN PATENT DOCUMENTS

| CN | 1881177 | 12/2006 |
| CN | 101558385 | 10/2009 |

(Continued)

OTHER PUBLICATIONS

Ghosh et al., "Smart refresh: An enhanced memory controller design for reducing energy in conventional and 3D die-stacked DRAMs", Proceedings of the 40th Annual IEEE/ACM International Symposium on Microarchitecture, 2007, pp. 134-145.

(Continued)

*Primary Examiner* — Phung M Chung
(74) *Attorney, Agent, or Firm* — Trop, Pruner & Hu, P.C.

(57) ABSTRACT

A cache memory system uses multi-bit Error Correcting Code (ECC) with a low storage and complexity overhead. In an embodiment, error correction logic may include a first error correction logic to determine a number of errors in data that is stored in a cache line of a cache memory, and a second error correction logic to receive the data from the first error correction logic if the number of errors is determined to be greater than one and to perform error correction responsive to receipt of the data. The cache memory system can be operated at very low idle power, without dramatically increasing transition latency to and from an idle power state due to loss of state. Other embodiments are described and claimed.

22 Claims, 6 Drawing Sheets

(56) References Cited

U.S. PATENT DOCUMENTS

| | | | |
|---|---|---|---|
| 7,430,693 B2* | 9/2008 | Noguchi et al. | 714/710 |
| 7,512,847 B2* | 3/2009 | Bychkov et al. | 714/723 |
| 7,590,920 B2* | 9/2009 | Yang et al. | 714/774 |
| 7,647,536 B2* | 1/2010 | Dempsey et al. | 714/711 |
| 7,930,612 B2* | 4/2011 | Radke et al. | 714/755 |
| 8,010,875 B2* | 8/2011 | Gara et al. | 714/773 |
| 2002/0038442 A1 | 3/2002 | Cypher | |
| 2003/0167437 A1 | 9/2003 | Desota et al. | |
| 2006/0031708 A1 | 2/2006 | Desai | |
| 2007/0011598 A1 | 1/2007 | Hassner et al. | |
| 2007/0168836 A1* | 7/2007 | Dempsey et al. | 714/763 |
| 2008/0148130 A1* | 6/2008 | Eilert | 714/763 |
| 2009/0222708 A1* | 9/2009 | Yamaga | 714/773 |
| 2010/0070809 A1 | 3/2010 | Dempsey et al. | |

FOREIGN PATENT DOCUMENTS

| | | |
|---|---|---|
| JP | 63-275225 | 11/1988 |
| JP | 02-075039 | 3/1990 |
| JP | 2003-203010 | 7/2003 |

OTHER PUBLICATIONS

Emma et al., "Rethinking refresh: Increasing availability and reducing power in DRAM for cache applications", IEEE Micro, vol. 28, No. 6, Nov. 2008, pp. 47-56.

Kim et al., "Multi-bit Error Tolerant Caches Using Two-Dimensional Error Coding", in Proceedings of the 40th Annual ACM/IEEE International Symposium on Microarchitecture (MICRO), Dec. 2007, pp. 197-209.

Strukov, "The area and latency tradeoffs of binary bit-parallel BCH decoders for prospective nanoelectronic memories", in Proceedings of 2006 Asilomar Conference on Signals Systems and Computers, Oct. 2006, pp. 1183-1187.

Yoon et al., "Memory Mapped ECC: Low-Cost Error Protection for Last Level Caches", in Proceedings of the 36th International Symposium on Computer Architecture (ISCA-36), Jun. 2009, pp. 116-127.

Venkatesan et al., "Retention-aware placement in DRAM (RAPID): Software methods for quasi-non-volatile DRAM", in Proceedings of 12th International Symposium on High-Performance Computer Architecture (HPCA), Feb. 2006, pp. 155-165.

State Intellectual Property Office of the People's Republic of China, Office Action mailed Feb. 8, 2013 in Chinese application No. 201110130191.X.

Japanese Patent Office, "Notice of Reasons for Rejection" dated Oct. 1, 2013, in Japanese application No. 2012-517938, including 4 pages of translation.

Patent Cooperation Treaty, Notification of Transmittal of the International Search Report and the Written Opinion of the International Searching Authority mailed Feb. 9, 2012, for international application no. PCT/US2011037319.

* cited by examiner

METHOD AND APPARATUS FOR USING CACHE MEMORY IN A SYSTEM THAT SUPPORTS A LOW POWER STATE

FIELD

The present invention relates generally to memory, and more particularly to reducing the power consumption of cache memory while a system is in a low power state.

BACKGROUND

Technology advancements have enabled the integration of large on-die embedded Dynamic Random Access Memory (eDRAM) caches with a Central Processing Unit (CPU). Embedded DRAM is significantly denser than traditional Static Random Access Memories (SRAMs), but must be periodically refreshed to retain data. Like SRAM, embedded DRAM is susceptible to device variations, which play a role in determining a refresh period for embedded DRAM cells. Power consumed to refresh eDRAM represents a large portion of overall system power, particularly during low-power states when the CPU is idle.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
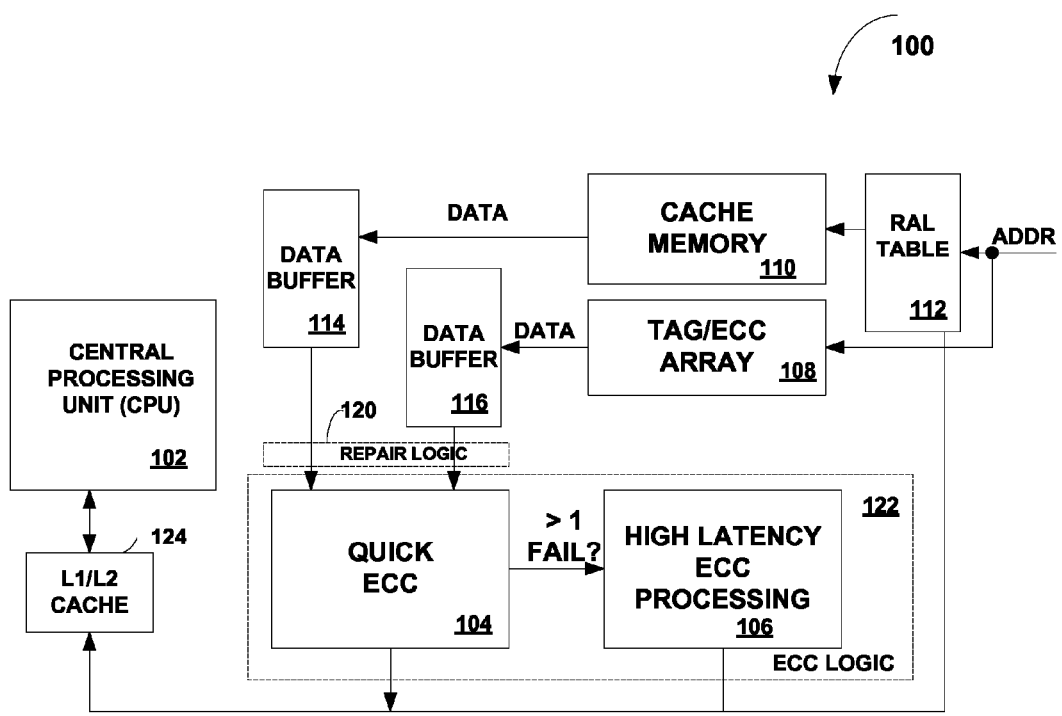
FIG. 1 is an embodiment of a processor that includes a cache memory and error code correction logic (ECC) according to the principles of the present invention.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Error-correcting codes (ECC) are typically used to allow non-volatile memory and storage devices to tolerate both soft and hard errors. On-chip caches in a device and memory devices (chips, integrated circuits) typically use simple and fast ECC such as, Single Error Correction and Double Error Detection (SECDED) Hamming codes. Slower devices such as flash memories use multi-bit ECCs with strong error correcting capabilities, for example, Reed-Solomon codes. The higher decoding latencies of the strong ECC mechanisms do not pose a problem for mass storage devices, for example, disk drives because the encoding/decoding latency is insignificant as compared to intrinsic device access time. However, as a result of technology scaling, the on-chip memory arrays (caches) are more susceptible to multi-bit errors. Thus, strong ECC codes are also desirable for on-chip cache. In addition to the latency overhead, the storage overhead of the additional ECC bits is an obstacle to using multi-bit ECC for on-chip cache memories.

In pursuit of improved power and energy efficiency, microprocessors implement a number of idle states to support lower power modes (states). Reducing the power consumed during idle states is particularly important because the typical Central Processing Unit (CPU) spends a lot of time in idle state. Embedded DRAM technology enables smaller memory cells as compared to SRAM cells, resulting in a large increase in memory density. Thus, DRAM may be used to replace SRAM as the last-level on-chip cache in high performance processors.

However, a problem with embedded DRAM (eDRAM) cells is that the cells lose charge over time due to leakage currents. The retention time of an eDRAM cell is defined as the length of time for which the cell can retain its state (charge). Cell retention time is dependent on the leakage current, which, in turn, is dependent on the device leakage. To preserve the state of stored data, eDRAM cells need to be refreshed on a periodic basis. In order to prevent loss of state in the cache, the refresh period needs to be less than the cell retention time. Since eDRAM is DRAM integrated on a conventional logic process it uses fast logic transistors with a higher leakage current than transistors used in conventional DRAM. Therefore, the refresh time for eDRAM is about a thousand times shorter than conventional DRAM. The shorter refresh period increases power consumed during the idle state and also leads to reduced availability.

In SRAM caches, intrinsic variations force operation at high voltages due to a few weak cells that fail (lose charge (state)) at lower voltages, and impede efforts to reduce power consumption during idle states. Likewise, in embedded DRAM caches, device variations affect the retention time between refresh of individual DRAM cells, with a few particularly weak cells (bits) determining the refresh period of the entire cache. Variations in threshold voltage cause retention times of different DRAM cells to vary significantly. These variations are caused predominantly by random dopant fluctuations and manifest themselves as a random distribution of retention times amongst eDRAM cells. However, increasing the refresh rate significantly increases cache power.

A method to reduce cache power is to use power gates. Power gates are switches on the power supply that allow power to be completely shut off to a block of transistors. Since memory technologies such as eDRAM and SRAM are unable to retain state when deprived of power, power-gating is performed at the cost of losing memory state.

As cache density increases, the performance and power consumption of power gating also increase. As the size of the embedded DRAM cache increases there is a tradeoff between idle exit latency (time to restore the state of the cache by retrieving cache lines from main memory) and power consumption during the idle state.

The DRAM refresh period may be increased through the use of error-correcting codes (ECC) to dynamically identify and repair cells that lose their state. The refresh rate is set irrespective of the weakest eDRAM cells, using ECC to compensate for lost state. A stronger error-correcting code, with the ability to correct multi-bit errors, implies increased refresh rate and reduced power consumption. However, multi-bit ECC codes have a high storage and complexity overhead which limit their applicability.

An embodiment of the present invention provides a flexible memory structure that uses multi-bit ECC codes with a low storage and complexity overhead and can operate at very low idle power, without dramatically increasing transition latency to and from the idle power state due to loss of state of cells (bits).

FIG. 1 is an embodiment of a processor 100 that includes a cache memory and error code correction (ECC) logic 122 according to the principles of the present invention. The ECC logic 122 is low-latency, low-cost, multi-bit error-correcting logic that compensates for high failure rates in volatile memory such as the memory cache 110 shown in FIG. 1. In the embodiment shown, the memory cache 110 is embedded DRAM (eDRAM). In other embodiments, the memory cache 110 may be Static Random Access Memory (SRAM) or any other type of volatile memory Correcting more errors requires higher redundancy, which leads to a high check bit overhead. For example, to correct t-bit errors in k-bit input data, a BCH code typically requires $r=t*\text{ceil}(\log_2 k)+1$ check bits. Due to the logarithmic relationship between r and k, the number of check bits increases much slower than the size of the input data. Thus, the ECC check bit overhead is reduced by increasing k.

For example, a Single Error Correcting, Double Error Detecting (SECDED) code for a 64 Byte (512-bit) cache line requires 11 bits which is an overhead of about 2%. The number of bits in an ECC code relative to the number of bits in the data word diminishes as the number of bits in the data word increases. For example, a SECDED code for a 64 Byte cache line has an 11-bit overhead (2%), and a SECDED code for a 1024 Byte (1 KB) cache line has a 15-bit overhead (0.18%).

However, when a large cache line is used, writes to sub-blocks within the cache-line may require the entire cache line to be read every time in order to regenerate the ECC bits. As a linear code, BCH inherits the additive property of linear systems, which ensures that ECC check bits can be updated using only the information of the modified sub-block (chunk of data). The data word d (representing a cache line) is divided into multiple chunks (sub-blocks)$[d_{t-1}, d_{t-2}, \ldots, d_0]$. The G matrix used in ECC encoding can be divided into two parts as $G=[I_k, P]$, where P is the generator for ECC check word C, i.e., $C=d \times P$. If the $j^{th}$ chunk of data $d_j$ is written with a new value $d_{j\_new}$, then the new ECC is:

$$C_{new} = d_{new} \times P \qquad (1)$$
$$= (d + [0, \ldots, (d_{j\_old} + d_{j\_new}), \ldots, 0]) \times P$$
$$= C + [0, \ldots, (d_{j\_old} + d_{j\_new}), \ldots, 0] \times P$$

Equation (1) shows that the generation of new check bits requires only the old value of check bits and the old and new values of the sub-block being modified.

Returning to FIG. 1, the ECC logic 122 is low-latency, low-cost, multi-bit error-correction logic that can compensate for high failure rates in the eDRAM cache 110. The ECC logic 122 implements a strong BCH code with the ability to correct five errors (5EC) and to detect six errors (6ED) (hereafter referred to as a 5EC6ED code). A traditional approach using multi-bit ECC suffers from two prohibitive overheads that limit its applicability. First, building a low-latency decoder for multi-bit ECC codes is extremely costly. Second, the storage overhead of ECC bits is high (around 10% for a 5EC6ED ECC code for a cache line having 64 bytes).

The ECC logic 122 implements a multi-bit error-correcting code with very small area, latency, and power overhead. The ECC logic 122 minimizes embedded DRAM power consumption in low-power operating modes (idle states) without penalizing performance in the normal operating mode. The ECC logic 122 includes a quick ECC logic 104 that is optimized for the cache lines that require little or no correction. The ECC logic 122 includes a high latency ECC logic 106 for cache lines that require complex multi-bit correction. In an embodiment, to minimize the performance impact of processing high latency multi-bit correction, the ECC logic 122 disables lines with multi-bit failures. In another embodiment, the ECC logic 122 leverages the natural spatial locality of the data to reduce the cost of storing the ECC bits.

In one embodiment, the embedded DRAM 110 is a 128 Mega Bytes (MB) last level (Level 3 (L3)) cache included in the processor 100. In a baseline configuration with no error correction capability, the time between refreshes for the embedded DRAM cache 110 is 30 microseconds (us). This results in a significant amount of power consumed even when the Central Processing Unit (CPU) 102 is idle. Power consumed during refresh (refresh power) may be reduced by flushing and power gating the embedded DRAM cache 110 during low-power operating modes, for example, idle states. This, however, causes a significant performance penalty when the CPU 102 wakes up from idle mode (state) because the CPU 102 needs to reload data from external memory (main memory (not shown)) into the embedded DRAM cache 110, thereby incurring a large number of cold start cache misses. Alternatively, refresh power consumption may be reduced by decreasing the refresh frequency, that is, increasing the refresh period (time between refreshes) of the data stored in cache lines in the embedded DRAM cache 110. However, there is a higher number of failures (loss of state of individual bits (cells)) for each cache line, if refresh frequency is decreased.

The ECC logic 122 implements a code on each 1 KB cache line (5EC6ED), requiring an additional 71 bits (0.87% overhead) for each cache line to store the 5EC6ED code. In an embodiment in which the refresh period is chosen such that no more than 1E-03 (that is, 1/1000) of the cache lines will fail, the baseline configuration with no failure mitigation operates at the baseline refresh time of 30 micro seconds (us). The error correction code logic 122 allows an increase in the refresh period to 440 micro seconds which is almost a 15 times reduction in the refresh period compared to the baseline configuration.

Logic to support a 5EC6ED code is very complex and imposes a long decoding latency penalty, proportional to both the number of error bits corrected and the number of data bits. If full encoding/decoding is required for every access to the cache memory, this can significantly increase cache access latency. In an embodiment of the present invention, error-prone portions of the cache can be disabled, avoiding the high latency of decode during operation.

The error code correction logic 122 includes a quick error correction code (ECC) logic (first error correction logic) 104 and a high-latency error correction code (ECC) logic (second error code correction logic) 106.

The Quick-ECC logic (unit) 104 includes syndrome generation logic and error correction logic for cache lines in eDRAM 110 with zero or one failures. The Quick-ECC logic 104 also classifies cache lines into two groups based on the syndrome: cache lines that require complex multi-bit error correction and cache lines that have less than two, that is, zero or one errors. Cache lines that require multi-bit error correction are forwarded to the high latency ECC processing logic (unit) 106 that performs multi-bit error correction. Cache lines that are corrected by the Quick ECC logic 104 are forwarded to the CPU 102 via L1/L2 cache 124.

In one embodiment, the high latency ECC processing logic 106 performs error correction using software. In another embodiment, the high latency multi-bit ECC processing logic 106 performs multi-bit error correction using a state machine. The combination of the quick ECC logic 104 and the high-latency ECC processing logic 106 allows cache lines in the eDRAM 110 that require one or less error corrections to be immediately corrected and forwarded with low latency to the CPU 102 via the L1/L2 cache 124. Latency increases for forwarding of cache lines in the eDRAM 110 with two or more failures to the CPU 102.

The quick ECC logic 104 in the ECC logic 122 performs a one cycle ECC to correct a single bit error in a cache line in the embedded DRAM 110. The high latency correction logic 106 in the ECC logic 122 performs un-pipelined, high-latency ECC processing to correct multiple bit errors in a cache line.

When a cache line is read from the embedded DRAM 110, it is passed through data buffer 114 to the quick error correction logic 104 together with the tag and ECC associated with the cache line read from the tag/ECC array 108. The tag and ECC are passed through data buffer 116 to the Quick ECC logic 104. A decoder (not shown) in the quick ECC logic 104 generates the syndrome for the received cache line. The generated syndrome includes information on whether the cache line has zero, one, or a higher number of errors. If the cache line has zero or one bit failures, the decoder in the quick ECC logic 104 performs the correction of the one bit failure in a short period of time. In one embodiment, the short period of time can be a single cycle (500 pico seconds (ps)). In other embodiments, the short period of time can be more than one cycle. The period of time is shorter than the time to perform multi-bit error correction by the high-latency ECC processing logic 106.

The high latency associated with handling multi-bit failures may significantly reduce performance. To avoid incurring this high latency, in an embodiment, disabling problematic lines or a mechanism such as bit-fix may be integrated in repair logic 120.

The frequency of errors plays a role in the disable strategy. If there is a low multi-bit error rate, an approach such as disabling cache lines containing multi-bit errors reduces the performance penalty. However, cache line disable results in unacceptable cache capacity loss if multi-bit error rates are high. If there is a high multi-bit error rate, a more complex mechanism such as bit-fix may be used to minimize the capacity lost to disabling cache lines.

In an embodiment, repair logic 120 is coupled between the data buffers 114, 116 and the quick ECC logic 122. With the additional repair logic 120, the performance penalty of multi-bit decoding is incurred only once, that is, the first time an error due to a weak cell in the eDRAM 110 is identified. The repair logic 120 allows the number of errors to be reduced prior to forwarding the cache line to the ECC logic 122. Thus, overall latency is reduced by first using a repair mechanism to fix known errors in a cache line prior to applying ECC to the cache line.

In one embodiment, the repair logic 120 includes bit fix logic. Bit fix logic identifies "broken" bit-pairs and maintains patches to repair the "broken" bit-pairs in the cache line. In an embodiment, the bit fix logic uses a quarter of the ways in a cache set to store positions and fixing bits for failing bits (that is, the correct state (value) for the failing bits in other ways of the set). In low-voltage mode, in an embodiment for a cache memory 110 implemented as an 8-way cache, two of the eight ways are reserved to store defect-correction information to correct the "broken" bit pairs.

The bit fix logic allows defective pairs, that is, groups of 2-bits in the cache line in which at least one bit is defective (due to a logic state retention failure) to be disabled. The bit fix logic maintains a 2-bit "patch" (correct bit state) that can be used to correct the defective 2-bit pair. Repair patterns are stored in selected cache lines in cache memory (eDRAM) 110. During low-voltage operation, the repair patterns (repair pointers and patches) are stored in the cache memory 110. A read or write operation on a cache-line first fetches the repair patterns for the cache line. When reading, repair patterns allow reads to avoid reading data from "broken" bits (defective bits). Using patches from the repair patterns, the cache line is reconstructed before being forwarded to the CPU 102, another cache, or written back to memory. When writing, repair patterns allow writes to avoid writing to failed bits. New patches are written to the repair patterns to reflect new data written to the cache. An embodiment of a repair mechanism (repair logic 120 that uses bit-fix logic) has been described. In other embodiments, repair mechanisms other than bit fix can be used to fix known errors prior to applying ECC.

In an embodiment, the cache memory 110 is a 32K 8-way cache having 64B cache lines. Each access to data stored in the cache memory 110 requires an additional access to retrieve the appropriate repair patterns. To access the repair patterns without increasing the number of ports, the bit-fix scheme organizes the cache memory 110 into two banks Two fix-lines are maintained, one in each bank, and each is used for repairing cache-lines in the opposite bank. The repair patterns for three cache lines fit in a single cache line. Thus a single fix-line (a cache line storing repair patterns) for every three cache lines is maintained. A fix-line is assigned to the bank opposite to the three cache lines that use its repair patterns. This allows a cache line to be fetched in parallel with its repair patterns without increasing the number of cache ports.

On a cache hit, the data line is read from one bank in the cache memory 110 and a fix-line is read from another bank in the cache memory 110. The data line passes through 'n' bit shift stages, where 'n' represents the number of defective bit pairs. Each stage removes a defective pair, replacing it with the fixed pair. As the fix-line may also contain broken bits, SECDED ECC is applied to correct the repair patterns in the fix line before they are used. After the repair patterns have been fixed, they are used to correct the data-line. Repairing a single defective pair consists of three parts. First, SECDED ECC repairs any defective bits in the repair pattern. Second, a defect pointer identifies the defective pair. Third, after the defective pair has been removed, a patch reintroduces the missing correct bits into the cache line.

Figure 2:
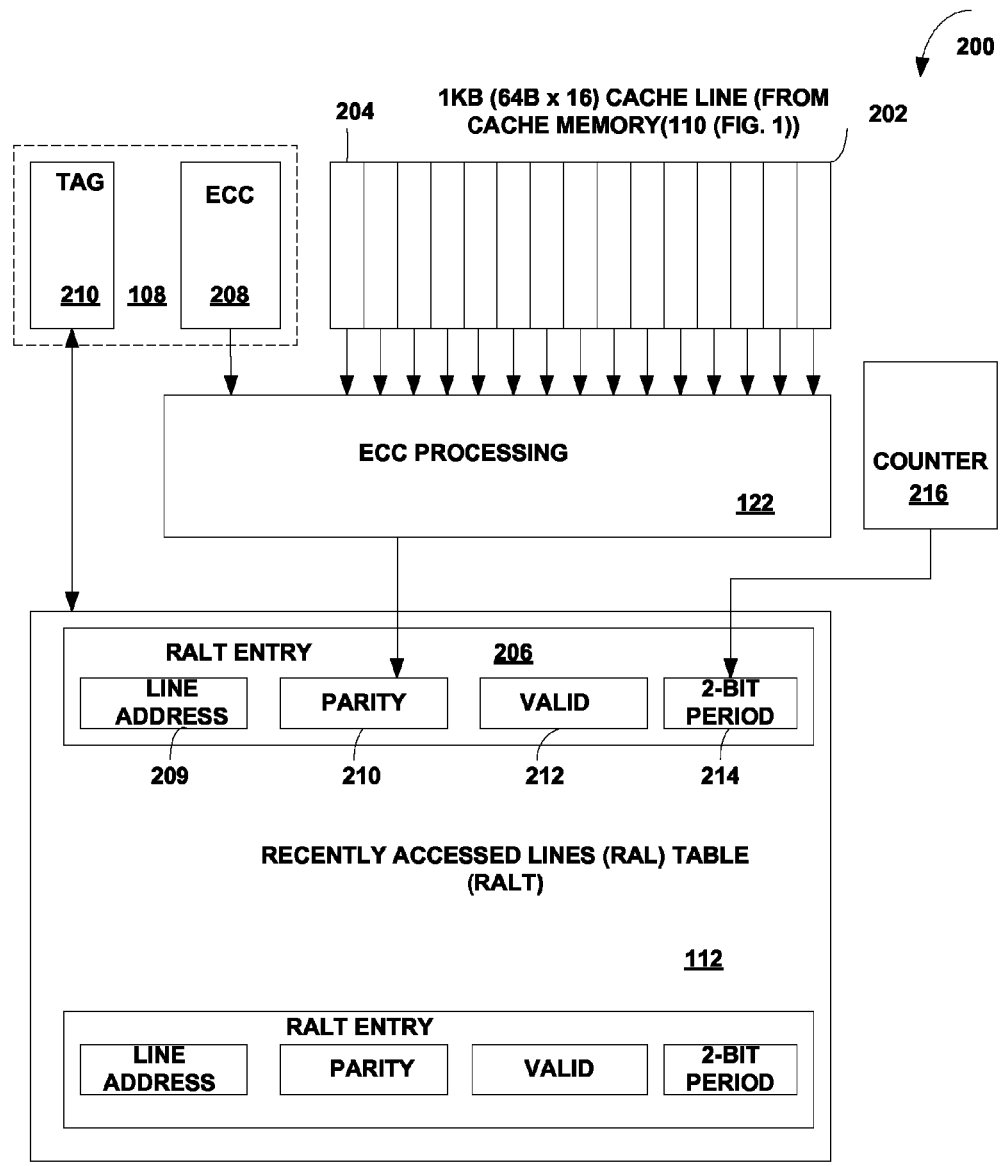
FIG. 2 is a block diagram of a system including an embodiment of a Recently Accessed Lines Table (RALT) and the cache memory and ECC logic shown in FIG. 1 illustrating a fast access to a cache line in the cache memory.

FIG. 2 is a block diagram of a system 200 including an embodiment of a Recently Accessed Line Table (RALT) 112 and the embedded DRAM cache 110 and ECC logic 122 shown in FIG. 1 illustrating a fast access to a cache line in the eDRAM cache 110.

A cache line size greater than 64 bytes is used to reduce the memory storage required to store multi-bit ECC codes. In an embodiment, the eDRAM cache 110 is a Level 3 (L3) cache which is 128 MB embedded DRAM and the size of a cache line 202 is 1024 Bytes (1 Kilobytes (KB)). A Level 2 (L2) cache/Level 1 (L1) cache 124 has a 64 Byte (B) cache line (referred to as a sub-block of the L3 cache line). Most writes to the L3 eDRAM cache 110 are in the form of smaller 64 Byte sub-blocks generated at lower-level (L1 or L2) cache memories 124 or fetched from non-cache memory (main memory/external memory (not shown)).

To modify a 64B sub-block 204 in a 1 KB cache line 202, a read-modify-write operation is performed by the CPU 102 in order to compute the ECC code. First, the 64B sub-block 204 that is being overwritten is read from the eDRAM cache 110 together with the ECC code 208 for the entire 1 KB cache line 202. The old data, old ECC code, and new data are used to compute the new ECC 208 for the entire 1 KB cache line 202. The new 64B sub-block 204 and a new ECC code 208 are written back to the L3 eDRAM cache 110. However, the entire 1 KB cache line 202 is not read in order to compute the new ECC 208 as will be discussed later.

Most reads from L3 cache 110 are performed to provide cache lines for allocation in lower-level (L1 and L2) caches 124. Processing any sub-block 204 of a cache line 202 requires the ECC 208 to be processed with the entire data word (a 1 KB cache line) 202 that it protects. As each 64B sub-block 204 in the 1 KB cache line 202 needs to be checked, each reference to a 64B sub-block 204 is accompanied by a reference to the surrounding 64B sub-blocks 204. Thus, any read of the L3 embedded DRAM cache 110 accesses all 16 64-bit sub-blocks 204 in the 1 KB cache line 202, in addition to the ECC 208 (per cache line) that all of the sub-blocks 204 share in the cache line 202. For example, in order to read only eight of the 16 sub-blocks 204 in one 1 KB cache line 202, all 16 sub-blocks 204 are read eight times, for a total of 128 separate sub-block reads. This large number of additional sub-block reads results in a substantial increase in dynamic power consumption and a reduction in the useful cache bandwidth provided by the eDRAM cache 110.

The majority of eDRAM failures are due to retention failures because as already discussed, the eDRAM cache 110 needs to be periodically refreshed to maintain the current state of each memory cell. In an embodiment, the retention time is 30 micro seconds (us), and each read of a particular cache line automatically implies a refresh of that cache line. Thus, retention failures should not occur for 30 us in a particular cache line after that cache line has been read. This observation allows the number the superfluous reads to be minimized. The RALT 112 is used to track cache lines that have been referenced (read) within the last 30 us.

The first read to a cache line 202 in the eDRAM cache 110 results in all of the sub-blocks 204 in the cache line 202 being read and checked for errors. The address of the cache line 202 that is read is stored in a RALT entry 206 in the RALT 112. The stored address indicates that the cache line 202 has recently been read and checked and thus should remain free from retention errors for the next 30 us. While the address of the read cache line is stored in the RALT 112, any subsequent reads of sub-block from that cache line 202 can forgo ECC processing and thus avoid reading the ECC 208 associated with the cache line 202 and other sub-blocks 204 in the cache line 202. The RALT 112 ensures that none of its entries 206 have been stored for more than 30 us by dividing each 30 us time period into a plurality of equal "cache line read" periods. Entries 206 that are allocated in the RALT 112 during each period are marked with a period identifier 214 identifying the sub-refresh period. Transitions between sub-refresh periods results in all RALT entries previously allocated in one of the plurality of "cache line read" periods to be invalidated (as indicated by the state of the "valid" field associated with the entry 206 in the RALT).

Each entry 206 in the RALT 112 includes the following fields: a line address field 209 to identify the cache line that the entry is associated with; a valid field 212, a period identifier field 214 to indicate in which period the line was allocated; and a parity field 211 that includes one parity bit for each sub-block in the cache line. In an embodiment the period identifier field 214 has two bits to indicate which of four periods (P0, P1, P2, P3) the cache line was allocated and the parity field 211 has 16-bits, one per 64B sub-block in the cache line. The RALT 112 is direct mapped, but supports a CAM (Content Addressable Memory) invalidate on the period field 214 to allow bulk invalidates of entries 206 in the RALT 112 during period transitions.

The first time a sub-block 204 is read, the entire ECC 208 is also read along with each sub-block in the 1 KB cache line 202 to allow ECC processing for a single 64B sub-block 204. The entry 206 associated with the cache line 202 in the RALT 112 is updated with the line address of the referenced cache line 202, a period identifier, and a single parity bit for each sub-block 204 in the cache line 202. After the first hit to a cache line 202, future accesses to the same cache line 202 within the refresh period do not require ECC processing.

The first read to a cache line causes all sub-blocks in the line to be read and checked for failures. The address of the line is then stored in the RALT to indicate that it has recently been checked and will remain free from retention failures for the next 30 usec. As long as the address of the line is stored in the RALT, any sub-block reads from the line can forgo ECC processing and thus avoid reading the ECC code and other sub-blocks in the line.

To operate correctly, the RALT 112 ensures that none of its entries are more than 30 us old. To guarantee this, a counter 216 is used to measure the passage of each 30 us period. Each 30 us period is divided into four equal sub-periods (P0, P1, P2, P3). Entries allocated in the RALT 112 during each period are marked with a 2 bit identifier to specify the allocation sub-period which can be determined by checking the current value of the counter. For example, the passage of 30 us in a 2 GHz processor 100 can be measured using a counter 216 that increments every cycle counting to 60000. Counter values between 0-15000 for example correspond to sub-period P0, 15001-30000 correspond to sub-period P1, 30001-45000 correspond to sub-period P2, and 45001-60000 correspond to sub-period P3. When the counter 216 reaches 60000 it resets to 0, resulting in a transition from P3 to P0. Each sub-period transition can cause the invalidation of some or all of the RALT entries allocated during the previous instance of that sub-period. For example, a transition from sub-period P0 to sub-period P1 will result in all RALT entries previously allocated in sub-period P1 to be invalidated.

Figure 3:
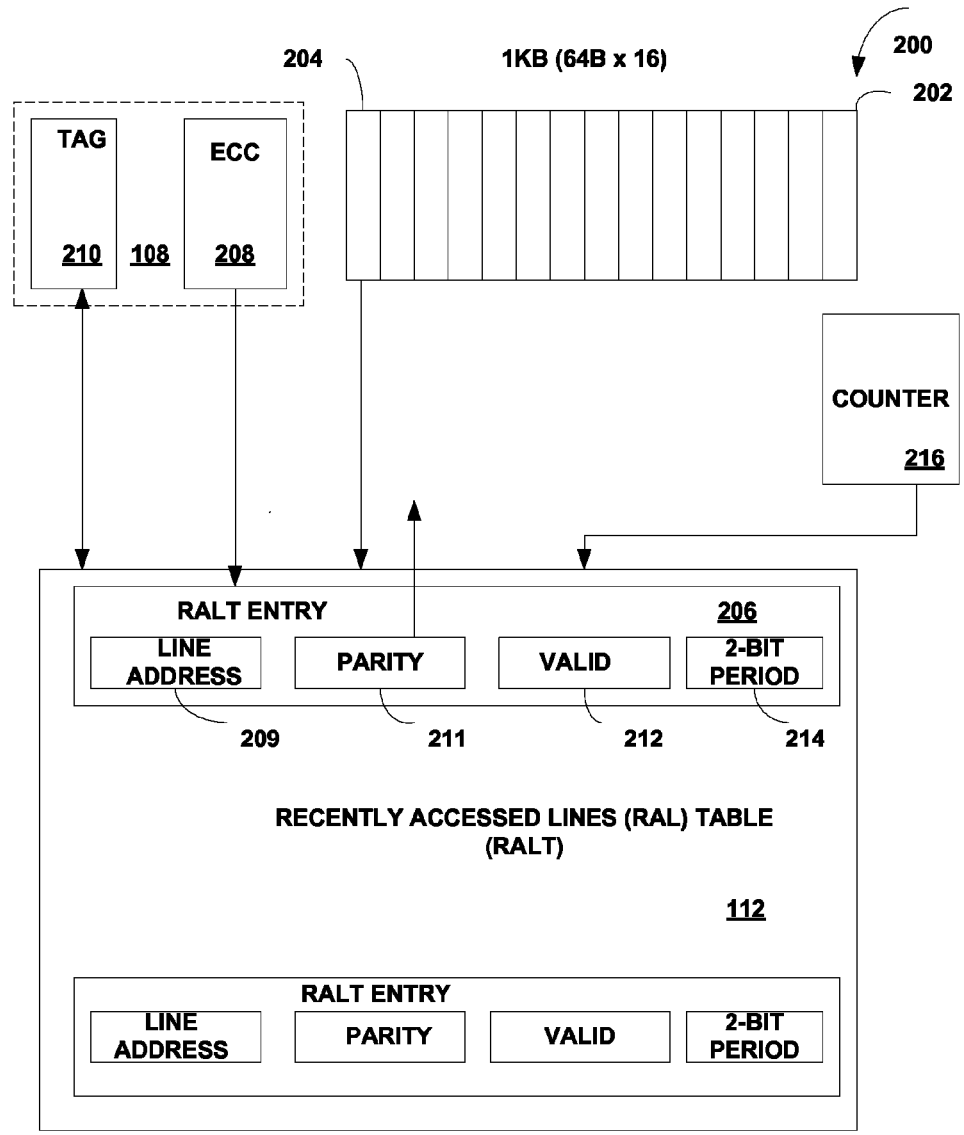
FIG. 3 is a block diagram of the system shown in FIG. 2 illustrating a subsequent read of a cache line within the refresh period.

FIG. 3 is a block diagram of the system shown in FIG. 2 illustrating a subsequent read of a cache line within the refresh period. In most cases, only the requested 64B sub-block 204 is read. Parity for the 64B sub-block 204 is computed and compared to the parity 211 for that 64B sub-block 204 of the cache line 202 stored in the RALT 112. If there is a match, the inference is that the 64B sub-block 204 is valid and the 64B sub-block 204 is forwarded to the requesting cache 124 or processor 102. A parity mismatch is treated as a RALT miss and the entire 1 KB cache line 202 is read. The RALT 112 is used to track recently accessed cache lines 202 to avoid reading the entire 1 KB cache line 202 on every cache read, thus minimizing dynamic power.

Figure 4A:
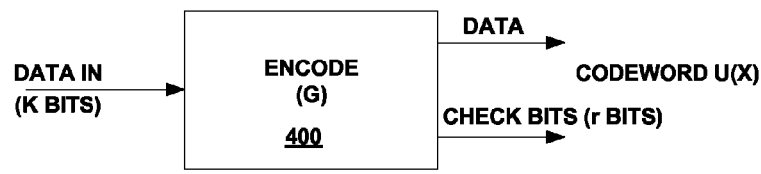
FIG. 4A is a block diagram illustrating an embodiment of an ECC encoder included in the quick ECC logic shown in FIG. 1.

FIG. 4A is a block diagram illustrating an embodiment of an ECC encoder 400 included in the quick ECC logic 104 shown in FIG. 1. BCH codes are a large class of multi-bit error-correcting codes which can correct both highly concentrated and widely scattered errors. In general, each BCH code is a linear block code defined over a finite Galois Field $GF(2^m)$ with a generator polynomial, where $2^m$ represents the maximum number of code word bits.

The ECC encoder (encoding logic) 400 takes the k-bit input data word d and uses a pre-defined encoder matrix G to generate the corresponding code word u ($u=d \times G$). As BCH is a systematic code, the original k-bit data is retained in the code word u(x), and is followed by r check bits.

Figure 4B:
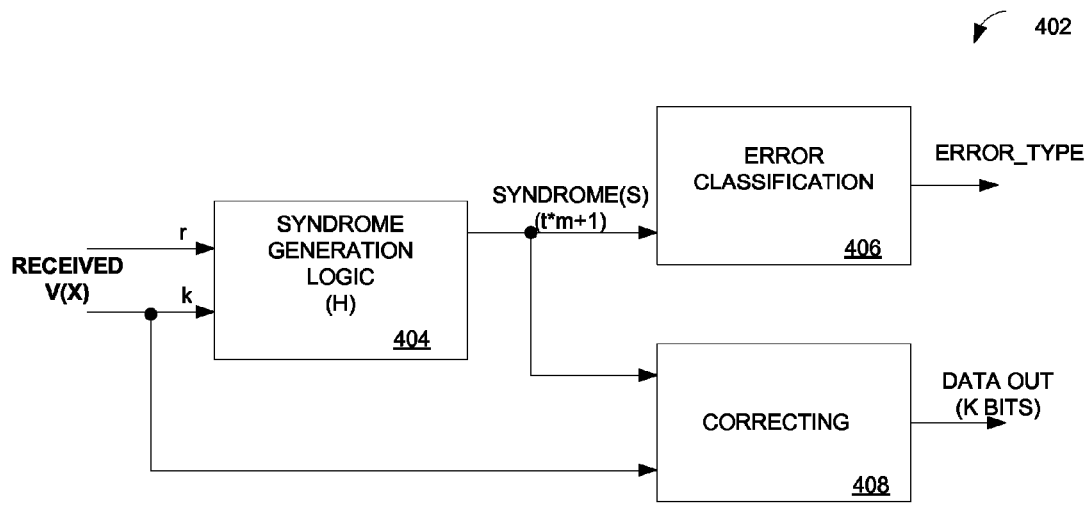
FIG. 4B is a block diagram illustrating an embodiment of an ECC decoder (decoding logic) included in the quick ECC logic shown in FIG. 1.

FIG. 4B is a block diagram illustrating an embodiment of an ECC decoder (decoding logic) 402 included in the quick ECC logic shown in FIG. 1. The decoding logic 402 detects and corrects any errors in the received code word u(x) to recover the original value of data. The decoding logic 402 includes syndrome generation logic 404, error classification logic 406 and error correction logic 408.

The syndrome generation logic 404 first computes a syndrome S by multiplying v (a code word with error e, such that $v=u+e$) with the transpose of a pre-defined H-matrix ($S=v \times H^T$). The G and H matrices are constructed in such a way that $G \times H^T = 0$. The general form of H-matrix is as follows:

$$H = \begin{bmatrix} \text{Parity} \\ H_1 \\ H_3 \\ \cdots \\ H_{2t-1} \end{bmatrix} = \begin{bmatrix} 1 & 1 & 1 & 1 & \cdots & 1 \\ 1 & \alpha & \alpha^2 & \alpha^3 & \cdots & \alpha^{(n-1)} \\ 1 & \alpha^3 & \alpha^6 & \alpha^9 & \cdots & \alpha^{3(n-1)} \\ \vdots & \vdots & \vdots & \vdots & \cdots & \vdots \\ 1 & \alpha^{(2t-1)} & \alpha^{2*(2t-1)} & \alpha^{3*(2t-1)} & \cdots & \alpha^{(2t-1)*(n-1)} \end{bmatrix} \quad (2)$$

In the finite field $GF(2^m)$, each element $\alpha^i$ can be represented as a polynomial of $\alpha$ with a degree less than m, or simply a vector with m binary coefficients of the polynomial. Therefore, the H matrix can be expanded into a binary matrix with $(t*m+1)$ rows, where t is the maximum number of errors that the code can correct. Since $S=v \times H^T$, S also has $t*m+1$ bits, which can be divided into multiple components [Parity, $S_1$, $S_3$, $S_{2t-1}$].

The error classification logic uses the syndrome S to detect if the code word has any errors. Since:

$$S = v \times H^T = (u+e) \times H^T = (d \times G + e) \times H^T = d \times (G \times H^T) + e \times H^T = e \times H^T \quad (3)$$

Therefore, in case of zero errors, $S=0$ and the following equation would hold true:

$$\text{Parity} = S_1 = S_3 = \ldots = S_{2t-1} = 0 \quad (4)$$

No errors in the code word lead to a syndrome value of zero, as shown in equation (3). This case can be detected by performing a logical OR of all the syndrome bits. This requires $\text{ceil}(\log_2 tm)$ 2-input gate delays.

The error correction logic uses the syndrome value to pinpoint the locations of corrupted bits, if the above equation is not satisfied.

Let the error locations in e be denoted as $[j_1, j_2, j_t]$, then each syndrome component $S_i$ can be specified as:

$$S_i = \alpha^{j_1 * i} + \alpha^{j_2 * i} + \ldots + \alpha^{j_t * i} \quad (5)$$

The correction logic implements the following three steps:

Step 1: Determine the coefficients of error location polynomial $\sigma(x)$, where $\sigma(x)$ is defined such that the roots of $\sigma(x)$ are given by the inverse of error elements $\alpha^{j_1}, \alpha^{j_2}, \ldots, \alpha^{j_t}$ respectively, $$\sigma(x) = 1 + \sigma_1 x + \ldots + \sigma_t x^t = (1 - \alpha^{j_1} x)(1 - \alpha^{j_2} x) \ldots (1 - \alpha^{j_t} x) \quad (6)$$

Step 1 of error correction is based on a t-step iterative algorithm, where each iteration involves a Galois Field inversion, which alone takes 2 m operations Step 2: Solve the roots of $\sigma(x)$, which are the error locations. When polynomial $\sigma(x)$ is determined, each field element $\alpha^j$ is substituted into the polynomial. Those elements which make the polynomial equal to zero are the roots. The implementation of Step 2 can either take n-cycles with one circuit, or a single cycle with n parallel circuits. Either way, the base circuit is $O(t*m^2)$.

Step 3: Calculate the correct value for data bits. This is done by simply flipping the bits at error locations.

In the case of a single-bit error, the syndrome exactly matches the H-matrix column that corresponds to the error bit. Therefore, a single-bit error can be detected by comparing each column of the H-matrix with the syndrome. This correction is significantly faster than the general case of t-bit correction (with t>1) because it does not require Step 1 and most of the Step 2 of the error correction logic. All the syndrome components do not need to be matched with entire H-matrix columns. All that is needed is to compare $S_1$ to each column in $H_1$ (defined in equation (1)) and verify that the following equation is satisfied:

$$[(\text{parity}=1) \& (S_1^3 == S_3) \& (S_1^5 == S_5) \& \ldots \& (S_1^{2t-1} == S_{2t-1})] == 1 \quad (7)$$

To minimize latency, the comparison of $S_1$ with $H_1$ and all the comparisons in equation (7) can proceed in parallel.

Figure 5:
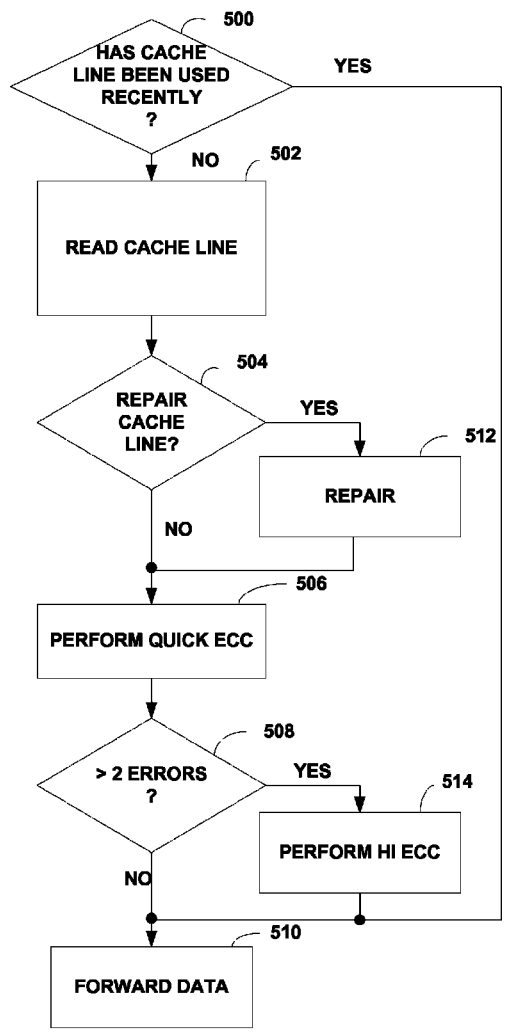
FIG. 5 is a flow graph illustrating an embodiment of a method for using the system shown in FIG. 1 according to the principles of the present invention.

FIG. 5 is a flow graph illustrating an embodiment of a method for using the system 100 shown in FIG. 1 according to the principles of the present invention.

At block 500, if the cache line address (addr) is associated with a RALT entry 206 in the Recently Accessed Line Table 112, the cache line has been recently accessed and no error checking is required, the cache line address is forwarded to the CPU 102 via the L1/L2 cache 124. If not, processing continues with block 502.

At block 502, the cache line address (addr) is stored in a line address field 209 in a RALT entry 206 the RALT Table 112 as discussed earlier in conjunction with FIG. 2. Data stored in the cache line in cache memory 110 and the Tag/ECC stored in the Tag/ECC array 118 corresponding to the address is read and forwarded through data buffers 114, 116. Processing continues with block 504.

At block 504, in an embodiment that includes repair logic 120, processing continues with block 512 to repair the cache line. In an embodiment that does not include repair logic, processing continues with block 506.

At block 506, quick ECC is performed by quick ECC logic 104 to determine if there are errors in the cache line. Processing continues with block 508.

At block 508, if there are more than two errors in the cache line to be corrected, processing continues with block 514. If there are less than two errors, the error is corrected by the quick ECC logic 104 and processing continues with block 510.

At block 510, the corrected cache line data is forwarded to the CPU 102 via L1/L2 cache 124.

At block 512, the cache line data read from cache memory 110 and forwarded through data buffers 114, 116 is repaired as discussed earlier. Processing continues with block 506.

At block 514, the Hi ECC logic corrects the multi-bit error in the cache line and processing continues with block 510.

Figure 6:
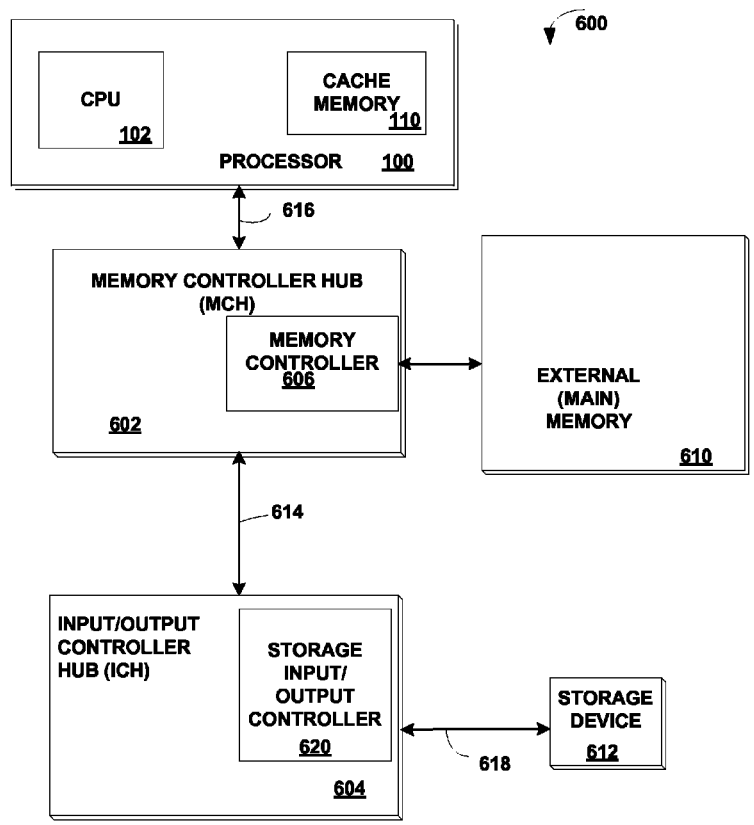
FIG. 6 is a block diagram of a system that includes an embodiment of the processor shown in FIG. 1.

FIG. 6 is a block diagram of a system 600 that includes an embodiment of the processor 100 shown in FIG. 1. The system 600 includes a processor 100 with embedded cache memory, a Memory Controller Hub (MCH) 602 and an Input/Output (I/O) Controller Hub (ICH) 604. The MCH 602 includes a memory controller 606 that controls communication between the processor 601 and external memory (main memory) 610. The processor 100 and MCH 602 communicate over a system bus 616.

The CPU 102 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory 610 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 604 may be coupled to the MCH 602 using a high speed chip-to-chip interconnect 614 such as Direct Media Interface (DMI). DMI supports 2 Gigabit/second concurrent transfer rates via two unidirectional lanes.

The ICH 604 may include a storage Input/Output (I/O) controller for controlling communication with at least one storage device 612 coupled to the ICH 604. The storage device may be, for example, a disk drive, Digital Video Disk (DVD) drive, Compact Disk (CD) drive, Redundant Array of Independent Disks (RAID), tape drive or other storage device. The ICH 604 may communicate with the storage device 612 over a storage protocol interconnect 618 using a serial storage protocol such as, Serial Attached Small Computer System Interface (SAS) or Serial Advanced Technology Attachment (SATA).

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
   a cache memory; and
   error correction logics, responsive to a request for data from a requesting device, to receive the data stored in a cache line in the cache memory if the cache line has not been previously accessed within a current refresh time period of the cache memory, and to perform error correction for the received data, the error correction logics comprising:
   a first error correction logic to generate a syndrome to determine a count of errors in the data, and to perform error correction on the data if the count of errors is determined to be one; and
   a second error correction logic to receive the data from the first error correction logic if the count of errors is determined to be greater than one, the second error correction logic to perform multi-bit error correction for the received data;
   wherein if the cache line has been previously accessed within the current refresh time period of the cache memory, the data is free of errors and the data is to be forwarded to the requesting device without performance of the error correction by the error correction logics.

2. The apparatus of claim 1, further comprising:
   repair logic, the repair logic to fix known errors in the data prior to forwarding the data to the error correction logics.

3. The apparatus of claim 2, wherein the repair logic is to fix the known errors through use of one or more patches.

4. The apparatus of claim 1, wherein the first error correction logic includes a decoder to perform the error correction in a shorter period of time than a second period of time associated with the multi-bit error correction.

5. The apparatus of claim 1, further comprising:
   a Recently Accessed Line Table (RALT) coupled to an address bus of the cache memory, the RALT to determine if the cache line has been accessed within the current refresh time period of the cache memory.

6. The apparatus of claim 1, wherein the error correction logics can detect up to six errors.

7. The apparatus of claim 1, wherein the error correction logics can correct up to five errors.

8. A method comprising:
   if a cache line of a cache memory has not been previously accessed within a current refresh time period of the cache memory, performing error correction comprising:
   receiving, by error correction logics, data stored in the cache line, the error correction logics comprising a first error correction logic and a second error correction logic;
   generating, by the first error correction logic, a syndrome to determine a number of errors in the data;
   forwarding the data, by the first error correction logic to a second error correction logic if the data has greater than one error; and
   performing, by the second error correction logic, multi-bit error correction for the data responsive to receiving the data forwarded by the first error correction logic; and
   responsive to a request from a requesting device, if the cache line has been previously accessed within the current refresh time period and so the data is free of errors, forwarding the data to the requesting device without performing the error correction.

9. The method of claim 8, wherein prior to receiving the data at the error correction logics, known errors in the data are repaired by repair logic using bit fix logic that employs one or more patches.

10. The method of claim 8, further comprising:
    determining, by a Recently Accessed Line Table (RALT) coupled to an address bus of the cache memory, whether the cache line has been accessed within the current refresh time period of the cache memory.

11. The method of claim 8, further comprising detecting up to six errors.

12. The method of claim 8, further comprising correcting up to five errors.

13. The method of claim 8, wherein single bit error correction is performed in one cycle.

14. An article including a machine-accessible non-transitory medium having associated information, wherein the information, when accessed, results in a machine performing:
    responsive to a request for data from a requesting device, if a cache line of a cache memory has not been previously accessed within a current refresh time period of the cache memory:
    receiving, by error correction logics, the data stored in the cache line, the error correction logics comprising a first error correction logic and a second error correction logic;

generating, by the first error correction logic, a syndrome to determine a number of errors in the data;

forwarding the data, by the first error correction logic to a second error correction logic if the data has greater than one error; and performing, by the second error correction logic, multi-bit error correction for the data if the data is forwarded by the first error correction logic; and if the cache line has been previously accessed within the current refresh time period and so the data is free of errors, forwarding the data to the requesting device without performing error correction, responsive to the request for the data.

15. The article of claim 14, wherein the information, when accessed, results in the machine further performing:

repairing, by repair logic, known errors in the data prior to the data being received by the error correction logics.

16. The article of claim 14, wherein the information, when accessed, results in determining, by a Recently Accessed Line Table (RALT) coupled to an address bus of the cache memory, whether the cache line has been accessed within the current refresh time period of the cache memory.

17. The article of claim 14, wherein the information, when accessed, results in performing, by the first error correction logic, error correction responsive to an indication of a single error in the data.

18. The article of claim 17, wherein the error is repaired in one cycle.

19. A system comprising:
an external memory; and
a processor, the processor comprising:
 a cache memory to store data read from the external memory into a cache line; and
 error correction logics, wherein responsive to a request for the data from a requesting device, if the cache line has not been previously accessed during a current refresh time period of the cache memory, the error correction logics are to receive the data and to perform error correction, the error correction logics comprising:
  a first error correction logic to generate a syndrome to determine a number of errors in the data and to correct the data if only one error is detected in the data; and
  a second error correction logic to receive the data from the first error correction logic if the number of errors in the data is determined to be greater than one, the second error correction logic to perform multi-bit error correction responsive to receipt of the data from the first error correction logic; and
 wherein if the cache line has been previously accessed within the current refresh time period of the cache memory the data is free of errors, and responsive to the request the data is to be forwarded to the requesting device without performance of the error correction by the error correction logics.

20. The system of claim 19, wherein the processor further comprises repair logic to fix known errors in the data through use of one or more patches prior to forwarding the data to the error correction logics.

21. The system of claim 19, wherein if only one error is detected in the data, the first error correction logic is to, after correction of the data is complete, forward corrected data to the requesting device without being sent to the second error correction logic.

22. The system of claim 19, wherein the error correction logics can detect up to six errors.

* * * * *